(12) United States Patent
Tran et al.

(10) Patent No.: US 6,600,722 B1
(45) Date of Patent: Jul. 29, 2003

(54) ROUTING CALLS IN A TELECOMMUNICATIONS NETWORK ON THE BASIS OF PASSBAND

(75) Inventors: Nhut Quan Tran, Cergy (FR); Cao Thanh Phan, Rueil Malmaison (FR)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/416,264

(22) Filed: Oct. 12, 1999

(30) Foreign Application Priority Data

Oct. 15, 1998 (FR) .......................................... 98 12931

(51) Int. Cl.$^7$ ................................................ H04J 15/00
(52) U.S. Cl. ...................................... 370/238; 370/235
(58) Field of Search ................................. 370/235, 238, 370/352; 379/221.07, 221.01, 243

(56) References Cited

U.S. PATENT DOCUMENTS

| | | | | |
|---|---|---|---|---|
| 4,345,116 A | * | 8/1982 | Ash et al. | 379/222.01 |
| 4,931,941 A | * | 6/1990 | Krishnan | 379/221.07 |
| 5,142,570 A | * | 8/1992 | Chaudhary et al. | 379/221.07 |
| 6,016,306 A | * | 1/2000 | Le Boudec et al. | 370/235 |
| 6,463,051 B1 | * | 10/2002 | Ford | 370/352 |
| 6,487,289 B1 | * | 11/2002 | Phan et al. | 379/243 |

FOREIGN PATENT DOCUMENTS

| | | |
|---|---|---|
| EP | 0 276 754 A1 | 8/1988 |
| EP | 0 830 047 A2 | 3/1998 |
| WO | WO 95/18498 | 7/1995 |

OTHER PUBLICATIONS

Z. Wang et al, "Bandwidth–Delay Based Routing Algorithms", IEEE Proceedings of the Global Telecommunications Conference, Nov. 14–16, 1995, vol. 3, pp. 2129–2133, XP000633662.

A. Bagchi, "Route Selection with Multiple Metrics", Information Processing Letters, vol. 64, No. 4, pp. 203–205, XP002110723.

* cited by examiner

*Primary Examiner*—Salvatore Cangialosi
(74) *Attorney, Agent, or Firm*—Sughrue Mion, PLLC

(57) ABSTRACT

The invention relates to a method of routing a call in a network having a plurality of nodes interconnected by trunks, the method including calculating the costs of different routes for taking the call, and selecting a route as a function of cost. According to the invention, the cost of a route is a function of the bandwidth available on the trunks making up the route, of the resources available on said trunks, and of the bandwidth required for the call. The cost of a trunk can be represented in the form of a vector whose first component is a decreasing function of the available bandwidth, and whose second component is a decreasing function of available resources. The invention makes it possible, when routing a call, to take account of quality of service in terms of bandwidth. If the second component is a function that has a value that is constant above some quantity of available resources, then the invention makes it possible to limit the number of routing calculations performed, and to avoid making new routing calculations so long as the topology of the network remains unchanged.

22 Claims, 1 Drawing Sheet

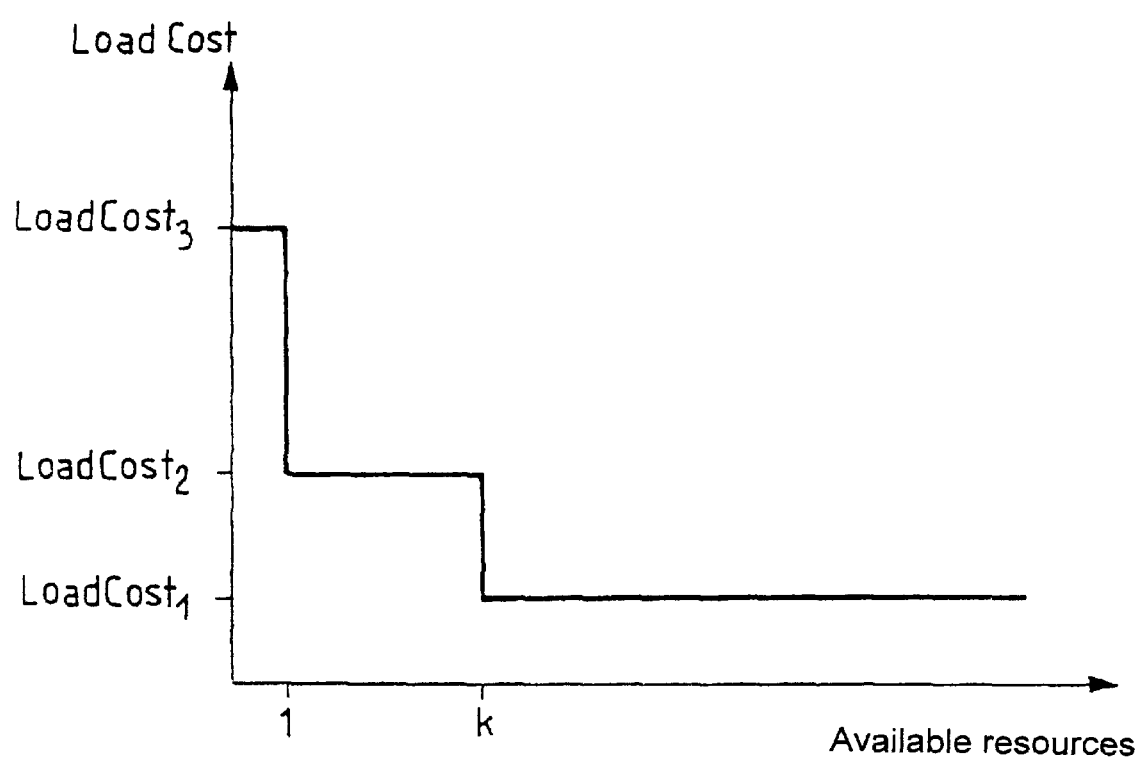

ROUTING CALLS IN A TELECOMMUNICATIONS NETWORK ON THE BASIS OF PASSBAND

The present invention relates to telecommunications networks, and more particularly to routing calls in a telecommunications network, in particular a private network, in which calls present passbands that are different.

BACKGROUND OF THE INVENTION

Private telecommunications networks are constituted by communications nodes that are interconnected by links or trunks conveying calls and/or signaling. J. Eldin and K. P. Lathia, "Le RNIS appliqué au Centrex et aux réseaux privés virtuels" [ISDN applied to Centrex and virtual private networks] contains a description of physical private networks and virtual private networks. As explained in that document, in a physical private network, the various sites or nodes are interconnected by specialized circuits, whereas in a virtual private network, each node is connected to the nearest local switch of the public network where appropriate software establishes connections on request. Two varieties of virtual private network are in existence: it is possible firstly to provide semipermanent connections which are set up without dialing, as soon as one of the nodes needs a circuit, and which always interconnect the same two points. This can apply in particular for signaling connections in an application to an integrated services digital network. It is also possible to provide switched connections which can be set up only by dialing. In the description below, consideration is given to private networks which can be physical or virtual, that are made up of nodes interconnected by trunks that can be of any type: trunks comprising dedicated connections or trunks that are set up by traveling over an external network; the external network can be of any type—the public switched telephone network, a terrestrial mobile public network, an integrated services digital network, another private network, etc.

In telecommunications networks, there arises the problem of call routing, i.e. choosing a sequence of trunks enabling a call to be taken through the network, and where necessary with overflows to an external network. The purpose of such call routing is to enable a call to be carried by the network while seeking to even out call loading within the network. In conventional manner, routing calculations are performed by defining a cost function for the trunks of the network. This function makes it possible to give each trunk a function that is representative of the risk of that trunk becoming blocked; it is possible for the calculated cost function to choose the ratio between the resources required and the resources available on the trunk:

cost:=resources required÷resources available

Under such circumstances, the best routing is the routing which minimizes the sum of the costs of the trunks that make up the routing. As a general rule, routing calculation is performed for call-routing purposes at the time that a call is set up.

OBJECTS AND SUMMARY OF THE INVENTION

A novel problem to which the invention provides a solution is that of the frequency at which routing calculations need to be performed. In the prior art solution described above, the cost of routing over a given trunk depends on the resources required and therefore varies from one call to another. It is therefore necessary to repeat a routing calculation for each new call, even if a call has already been routed from the same originating node to the same destination node. That problem does not appear in the prior art where it has been taken for granted that routing calculations need to be performed when setting up a call.

In addition, in private networks there arises the problem of managing passbands. Insofar as networks carrying different types of call (voice, data, or other), different protocols propose, as different qualities of service, calls that have different passbands. For example this applies to the X25, Frame relay, and N×64 Kb/s circuit protocols. In some of those protocols, for example the X25 and Frame relay protocols, it is possible to fall back to narrower passbands if passband is in short supply.

Another novel problem to which the invention provides a solution is that of including passband management in call routing. Prior art solutions provide no guarantee concerning passband in the setting up of a call, and at best provide for falling back to a narrower passband.

The invention proposes a method of routing a call which makes it possible to manage passbands effectively, by making it possible to guarantee some particular quality of service. The solution of the invention also makes it possible to limit the number and the frequency of routing calculations.

To do this, the invention provides a method of routing a call in a network having a plurality of nodes interconnected by trunks, the method comprising calculating the costs of different routes for taking the call, with selection between routes being a function of cost, where the cost of a route is a function:

of the passband available on the trunks constituting the route;

of the resources available on said trunks; and of the sum of the costs of the trunks constituting the route;

the cost of a trunk being a vector having a first component which is a function of the bandwidth available on the trunk and another component which is a function of the resources available on the trunk;

wherein the cost of a route is also a function of the bandwidth required for the call.

In a first variant, the first component is a function whose value is zero if the available bandwidth is greater than or equal to the bandwidth required for a call, and has a "saturated" value if the available bandwidth is less than the bandwidth required.

In a second variant, the first component is a function having the value zero if the available bandwidth is greater than or equal to the bandwidth required for a call, and a value equal to the difference between the bandwidth required and the bandwidth available if the bandwidth available is less than the bandwidth required.

In which case, the second component has a value that is constant for available resources that are above a predetermined quantity. The method of the invention then makes it possible to limit the number of routing calculations and to avoid performing new routing calculations so long as the topology of the network does not change.

Preferably, the second component is a function that has a finite number of possible values.

In another implementation, the second component is a decreasing function of the quantity of resources available.

Advantageously, the first component is a decreasing function of the bandwidth available.

Preferably, the step of selecting a route is performed in such a manner as to minimize the cost of the routing for an ordering relationship in which a first vector is less than a second vector if the first component of the first vector is less than the first component of the second vector, and if said first components are equal, the second component of the first vector is less than the second component of the second vector.

Advantageously, the vector sum of first and second vectors is defined as the vector whose first component is equal to the smaller of the first components of said first and second vectors, and whose second component is equal to the sum of the second components of the first and second vectors.

In an implementation, the step of calculating the various routes is performed by applying Dijkstra's algorithm.

The invention also provides apparatus for implementing the invention.

BRIEF DESCRIPTION OF THE DRAWING

Other characteristics and advantages of the invention will appear on reading the following description of embodiments of the invention, given by way of example and with reference to the accompanying drawing, in which the sole FIGURE is a graph of the load component of the cost vector in an embodiment of the invention.

MORE DETAILED DESCRIPTION

In a telecommunications network, the invention proposes taking passband into account when defining costs and when calculating routings. It enables the network to guarantee the required passband, if available, or a larger passband, while minimizing the number of nodes and trunks included in the routing. For this purpose, the invention proposes considering a cost function Cost that is of vector form, i.e. that has two independent components; this cost vector has one component which is a function of the passband available on a trunk and another component which is a function of the load on the trunk. The cost vector can thus have the form:

Cost: (BandCost; LoadCost)

The first component, "BandCost" is the component that is a function of the bandwidth available on the trunk. It serves to take account in a routing calculation over the private network not only of the loading on the trunks, but also of the bandwidth available on the trunk. The definition of the first component is explained in greater detail with reference to examples in the description below. The second component, "LoadCost" is a function of the load on the trunk, and it is described in greater detail below with reference to the figure.

For a possible routing of a call, the cost vector is defined by iteration, by summing the cost vectors defined on each of the trunks and on each of the expected overflows constituting the routing. Thus, the only calculations performed are to define the cost vector between two nodes, as defined above, and to sum two vectors.

Such a sum can be defined as follows:

$Cost_1 + Cost_2 := (Min\ [BandCost_1;\ BandCost_2];$
$LoadCost_1 + LoadCost_2)$ In other words, when cost vectors are summed over two trunks, the first component (which is the component representative of bandwidth) is equal to the bandwidth available on the route constituted by the two trunks. It is thus the smaller of these bandwidths on the two trunks, which is represented in the above formula by the function Min.

The second component of a cost vector is representative of the load on a trunk. The second component of the sum of two cost vectors is equal to the sum of the second components of the summed vectors. Intuitively, this is represented by the fact that independently of bandwidth, the cost of taking a route made up of two trunks is equal to the sum of the costs on both trunks.

The definition of such a cost vector for a trunk, and the definition of a corresponding sum in vector space makes it possible to give a cost to each route in the network. The invention proposes an ordering relationship in cost vector space so as to be able to compare routes and define a "best" route. This ordering relationship is defined as follows:

$Cost_1 < Cost_2$
if $BandCost_1 < BandCost_2$
or if $BandCost_1 = BandCost_2$ and $LoadCost_1 < LoadCost_2$ The above-defined relationship is indeed an ordering relationship; if one route has narrower bandwidth than another route, then its cost is lower. For equal bandwidth, then the route having the smaller cost is the route for which the component representing load is the smaller.

These definitions make it possible to calculate different possible routings, and to compare the various routes in order to select one of them.

The value of the first component can vary as a function of the protocols used. There follows a description of an embodiment of the invention adapted to protocols that include fall-back or regression, such as X25, for example. Under such circumstances, the first component of the cost vector depends on the route calculated; in other words, a routing calculation is performed between an originating node and a destination node for a required passband value $b_{req}$. The first component BandCost of a given trunk having an available passband $b_{avail}$ then becomes:

$BandCost := 0$ if $b_{avail} = b_{req}$ and
$BandCost := b_{req} - b_{avail}$ if $b_{avail} < b_{req}$ In other words, in this case, the component which is a function of the available bandwidth is zero if the available bandwidth is greater than or equal to the bandwidth required for the routing, and it is equal to the fall-back position if the available passband is less than the passband required for the routing. By applying the above-defined ordering relationship, it is possible to look for a routing having a passband that is greater than or equal to the passband required, and that presents a minimum cost.

If the required passband is not available, then it is appropriate to minimize the fall-back position, independently of cost. Again it is clear that a change in the ordering relationship or in the definition of the second component which is a function of load can change the looked-for objectives.

A second embodiment is described below adapted to protocols of the N×64 type in which fall-back or regression is not allowed. Under such circumstances, using the same notation as above, it is possible to define the first component of the cost vector as follows:

$BandCost := 0$ if $b_{avail} = b_{required}$ and
$BandCost := 8$ if $b_{avail} < b_{required}$
where the value 8 or "saturated" is a value which by definition is greater than any other value. Such a definition for the first component of the cost function makes it possible to look for minimum cost routings capable of carrying the call.

In a third embodiment, the invention proposes merely considering that the first component is equal to the inverse of the bandwidth available on the trunk, i.e.:

$BandCost := -b_{avail}$

In this case, the invention serves simply to find the routing having the greatest bandwidth, and for equal bandwidth the routing having the least cost.

In all cases, it is possible to use the Dijkstra algorithm to determine a call routing that minimizes the above-defined cost vector, taking into account the passband that is required. The Dijkstra algorithm is described in works on algorithms, and it is known for finding the shortest path between two nodes in a weighted graph. In the application of this algorithm to the present invention, the nodes of the graph are formed by the nodes of the network. The paths between the nodes are formed by the trunks of the private network, or in the event of possible overflow, by overflows onto an external network. Distance is the above-defined cost vector, and the conventional order relationship for reals is replaced in the application of the algorithm by the above-defined ordering relationship. It is also possible when calculating routings by means of the invention to use algorithms analogous to the Dijkstra algorithm, providing they also serve to find the shortest path. By way of example, mention can be made of the Bellman algorithm or of the Floyd algorithm; it will be observed that the Bellman algorithm applies only to graphs without loops.

The invention proposes making the calculation of the shortest path in the Dijkstra algorithm or in some analogous algorithm even quicker by not traveling over branches in the tree that cannot lead to a satisfactory solution. The Dijkstra algorithm proceeds as follows: a graph G of N nodes is considered, which graph is weighted, i.e. each path existing between two nodes i and j is given a weight or value $I(i,j)$. A starting node s of the graph G and a destination node d are taken into consideration and a path is sought that minimizes the distance from s to d expressed as $\pi(s,d)$, i.e. the sum of the weights of the links connecting s to d. The subgraph of G formed by the nodes x for which the minimum path to s is known is written S and the component thereof is written S'. The set of nodes adjacent to a given node i is written $\Gamma_i$.

Initially, the subnode S contains only the node s, and S' contains all of the other nodes, given the following initial values:

$\pi(s,i)=I(s,i)$ for $i \in \Gamma_s$, the parent node being s; and $\pi(s,d)=\infty$ for the other nodes, which do not have a parent node.

An iteration of the algorithm is performed as follows.

If S' is empty, or if it contains only nodes i for which $\pi(s,i)=\infty$, then the algorithm has terminated.

Otherwise, consideration is given to the node n of S' which is closest to the start node, i.e. the node which minimizes $\pi(s,i)$, $i \in S'$; this node is taken out of S' and put into S.

Thereafter, the neighbors of this node n are considered and the following is calculated:

$\pi(s,n)+I(n,j)$, $j \in \Gamma_n$ and $j \in S'$;

if this quantity is less than $\pi(s,j)$, then $\pi(s,j)$ is updated:

$\pi(s,j):=\pi(s,n)+I(n,j)$ and the parent node of j is also updated, becoming n.

This operation is performed for all of the nodes of $\Gamma_n$, and then S' is reordered.

As a result, the set of nodes in the graph is progressively added to S by proceeding by increasing path length. If a path is being sought to a given node d, the algorithm can be interrupted before the end, as soon as the destination node has been added to the subgraph S.

The algorithm can be proved by reductio ad absurdum as follows. Consider the node n that is closest in S', for adding to S. If there exists a closer path, this path starts from s and reaches n and has a first node in S' that is written m. In which case:

$\pi(s,m)+\pi(m,n)<\pi(s,n)$
and since $\pi(m,n)$ is positive or zero $\pi(s,m)<\pi(s,n)$ which is contrary to the initial assumption. It is also clear that $\pi(s,m)$ has been calculated in a preceding iteration when the parent of m was added to S.

In the invention, during an iteration of the algorithm, when nodes adjacent to the node n closest to the source node that has just been removed from S'0 are taken into consideration, it is not possible to take into consideration those trunks for which the first cost component is infinite. In other words, there is no need to explore those branches of the tree for which it is known that the result obtained cannot be a route that is acceptable in protocol terms. This serves to limit the time required for calculating the algorithm.

The invention also proposes defining the cost function in such a manner as to minimize the number and the frequency of routing calculations. For this purpose, the invention proposes that at least one of the components of the cost vector has values that are discrete, in other words that this component possesses a finite number of possible values. The figure shows one possible appearance for the second component LoadCost, which is a function of the load on a trunk of the network; the LoadCost component is plotted up the ordinate while available resources are plotted along the abscissa, for example in the case of an ISDN type network, where the trunk is made up of a plurality of T0 or T2 accesses, the available resources correspond to the number of B channels that are free.

The figure shows essentially that the second component is an increasing function of load, or in strictly equivalent manner, a decreasing function of the resources available on the trunk. This function has a value that is constant below some given load value, or in equivalent manner has a value that is constant beyond a given value for resource availability.

In the example, the load has an infinite value, i.e. a value that is greater than any other value, if the trunk is interrupted. It has a "saturated" value if no channel is available; this "saturated" value is selected so as to be greater than the sum of all of the possible costs of routing by means of B channels. It has a first value $LoadCost_3$ if only one channel is available, a second value $LoadCost_2$ if 2 to k channels are available where k is an integer, and a value $LoadCost_1=1$ if more than k channels are available, with $LoadCost_2 > LoadCost_1$. A suitable value for k is about 10. Choosing a relatively small value for k serves to avoid recalculating routings while cost is not varying. Other values are possible, particularly as a function of the capacity of a trunk and the number of channels occupied by a call. The values chosen for $LoadCost_i$, the number of $LoadCost_i$ values, and the load values chosen at which the function changes value depend on the nature of the network, and on the desired load distribution. These values can be absolute values, as in the present example, or they can themselves be functions of the total capacity of the trunk.

It is also possible to define the various values of $LoadCost_i$ as follows:

$LoadCost_i=(N-1) LoadCost_{i-1}+1$ where N is the number of nodes and $LoadCost_1=1$.

This choice enables calls to be distributed uniformly over the various routings.

The choice in accordance with the invention of a cost which is a function of the resources available on the trunks, instead of being a function of the resources required, as in the prior art, makes it possible to limit quite considerably the number and the frequency of routing calculations that need to be performed. Taking by way of example a value of k equal to 10, as described above, there is no need to perform any routing recalculation so long as the trunks of the network present at least ten available channels. This avoids repeating routing calculations between the same originating and destination nodes so long as the network remains lightly loaded. By way of comparison, the prior art proposes recalculating a routing for each request to set up a call. The advantage can thus be seen of the function defined with reference to the figure having a value that is constant as soon as the resources available on the trunk exceed some given value.

Naturally, the invention is not limited to the embodiments and implementations described and shown, and it can be modified in numerous ways by the person skilled in the art. It applies to networks of types other than the private networks mentioned in the description. It is also clear that the invention is not limited to the embodiments described. It is possible to select different definitions for the components of the cost vector and for the ordering relationship, depending on the constraints of the network in which the invention is to be applied.

What is claimed is:

1. A method of routing a call in a network having a plurality of nodes interconnected by trunks, the method comprising:
    calculating costs of different routes for taking the call, with selection between routes being a function of cost, where the cost of a route is a function of the passband available on the trunks constituting the route, the resources available on said trunks, and the sum of the costs of the trunks constituting the route;
    the cost of a trunk being a vector having a first component which is a function of the bandwidth available on the trunk and another component which is a function of the resources available on the trunk;
    wherein a constant value is defined when the available trunk resources exceed a given value, thereby limiting a number and frequency of repeated route calculations performed; and
    wherein the cost of a route is also a function of the bandwidth required for the call.

2. The method according to claim 1, wherein the first component is a function whose value is zero if the available bandwidth is greater than or equal to the bandwidth required for a call, and has a saturated value if the available bandwidth is less than the bandwidth required.

3. The method according to claim 1, wherein the first component is a function having the value zero if the available bandwidth is greater than or equal to the bandwidth required for a call, and a value equal to the difference between the bandwidth required and the bandwidth available if the bandwidth available is less than the bandwidth required.

4. The method according to claim 1, wherein the second component has a value that is constant for available resources that are above a predetermined quantity.

5. The method according to claim 1, wherein the second component is a function that has a finite number of possible values.

6. The method according to claim 1, wherein the second component is a decreasing function of the quantity of resources available.

7. The method according to claim 1, wherein the first component is a decreasing function of the bandwidth available.

8. The method according to claim 1, wherein the step of selecting a route is performed in such a manner as to minimize the cost of the routing for an ordering relationship in which a first vector is less than a second vector if the first component of the first vector is less than the first component of the second vector, and if said first components are equal, the second component of the first vector is less than the second component of the second vector.

9. The method according to claim 1, wherein the vector sum of first and second vectors is defined as the vector whose first component is equal to the smaller of the first components of said first and second vectors, and whose second component is equal to the sum of the second components of the first and second vectors.

10. The method according to claim 1, wherein the step of calculating the various routes is performed by applying Dijkstra's algorithm.

11. An apparatus for routing a call in a network having a plurality of nodes interconnected by trunks, the apparatus comprising:
    means for calculating the costs of various routes for taking the call, and for selecting one particular route as a function of cost, the cost of a route being a function of the bandwidth available on the trunks constituting the route, the resources available on said trunks and the sum of the costs of the trunks constituting the route;
    the cost of a trunk being a vector having a first component which is a function of the passband available on the trunk and another component which is a function of the resources available on the trunk;
    wherein the apparatus is configured to define a constant value when the available trunk resources exceed a given value, thereby limiting a number and frequency of repeated route calculations performed; and
    the apparatus including means for calculating a route cost as a function also of passband required for the call.

12. The apparatus according to claim 11, including means for calculating the first component by means of a function whose value is zero if the available bandwidth is greater than or equal to the passband required for a call, and a saturated value if the available bandwidth is less than the bandwidth required.

13. The apparatus according to claim 11, including means for calculating the first component by means of a function having a value zero if the available bandwidth is greater than or equal to the bandwidth required for a call, and a value equal to the difference between the bandwidth required and the available bandwidth if the available bandwidth is less than the bandwidth required.

14. The apparatus according to claim 11, including means for calculating a second component having a value that is constant for available resources that are above some predetermined quantity.

15. The apparatus according to claim 11, including means for calculating a second component by means of a function that has a finite number of possible values.

16. The apparatus according to claim 11, including means for calculating a second component by means of a decreasing function of the quantity of resources available.

17. The apparatus according to claim 11, including means for calculating a first component as a decreasing function of the bandwidth available.

18. The apparatus according to claim 11, wherein the means for selecting a route include means for minimizing the cost of the routing using an ordering relationship in which a first vector is less than a second vector if the first component of the first vector is less than the first component of the second vector, and if the first components are equal, if the second components of the first vector is less than the second component of the second vector.

19. The apparatus according to claim 11, including means for calculating the vector sum of a first vector and a second vector by constituting a vector whose first component is equal to the smaller of the first components of said first and second vectors, and whose second component is equal to the sum of the second components of the first and second vectors.

20. The apparatus according to claim 11, including means for applying Dijkstra's algorithm to calculate different routes.

21. A method of routing a call in a network having a plurality of nodes interconnected by trunks, the method comprising:

calculating costs of different routes for taking the call, with selection between routes being a function of cost, where the cost of a route is a function of the passband available on the trunks constituting the route, the resources available on said trunks, and the sum of the costs of the trunks constituting the route;

the cost of a trunk being a vector having a first component which is a function of the bandwidth available on the trunk and another component which is a function of the resources available on the trunk;

wherein because the cost of a route is a function of resources available on the trunks and not a function of the resources required by varying calls, a number of repeated routing calculations is limited.

22. A router for routing a call in a network having a plurality of nodes interconnected by trunks, the router comprising:

a route calculating mechanism configured to calculate the costs of various routes for taking the call, and for selecting one particular route as a function of cost, the cost of a route being a function of the bandwidth available on the trunks constituting the route, the resources available on said trunks and the sum of the costs of the trunks constituting the route;

the cost of a trunk being a vector having a first component which is a function of the passband available on the trunk and another component which is a function of the resources available on the trunk;

wherein because the cost of a route is a function resources available on the trunks, the cost calculating mechanism is configured to define a constant value when the available trunk resources exceed a given value, thereby limiting a number and frequency of repeated route calculations performed; and the router including a calculating mechanism for calculating a route cost as a function also of passband required for the call.

* * * * *